US009933540B2

(12) United States Patent
Miles et al.

(10) Patent No.: US 9,933,540 B2
(45) Date of Patent: Apr. 3, 2018

(54) MULTIPLE RECEIVERS FOR AIRBORNE ELECTROMAGNETIC SURVEYING

(71) Applicant: FUGRO CANADA CORP., Mississauga (CA)

(72) Inventors: Philip John Miles, Oakville (CA); Richard Thomas Partner, Kemptville (CA)

(73) Assignee: CGG DATA SERVICES AG, Zug (CH)

( * ) Notice: Subject to any disclaimer, the term of this patent is extended or adjusted under 35 U.S.C. 154(b) by 403 days.

(21) Appl. No.: 14/431,991

(22) PCT Filed: Sep. 30, 2013

(86) PCT No.: PCT/CA2013/000833
§ 371 (c)(1),
(2) Date: Mar. 27, 2015

(87) PCT Pub. No.: WO2014/047730
PCT Pub. Date: Apr. 3, 2014

(65) Prior Publication Data
US 2015/0241590 A1 Aug. 27, 2015

Related U.S. Application Data

(60) Provisional application No. 61/706,840, filed on Sep. 28, 2012.

(51) Int. Cl.
*G01R 33/02* (2006.01)
*G01V 3/08* (2006.01)
(Continued)

(52) U.S. Cl.
CPC .............. *G01V 3/17* (2013.01); *G01V 3/165* (2013.01)

(58) Field of Classification Search
CPC ... G01V 3/08; G01V 3/12; G01V 3/15; G01V 3/16; G01V 3/165; G01V 3/17; G01R 33/02
(Continued)

(56) References Cited

U.S. PATENT DOCUMENTS 4,367,439 A 1/1983 Fraser
4,628,266 A * 12/1986 Dzwinel ................ G01V 3/165
324/330
(Continued)

FOREIGN PATENT DOCUMENTS

CA 2748278 A1 7/2010
GB 827842 A 2/1960
(Continued)

OTHER PUBLICATIONS

International Search Report and Written Opinion of the International Searching Authority in related International Application No. PCT/CA2013/000833, dated Dec. 5, 2013.
(Continued)

*Primary Examiner* — Arleen M Vazquez
*Assistant Examiner* — Neel Shah
(74) *Attorney, Agent, or Firm* — Patent Portfolio Builders PLLC

(57) ABSTRACT

The invention discloses a receiver section towed by an airborne electromagnetic survey system, comprising a plurality of receivers, each receiver comprising at least one receiver coil. The invention further discloses an airborne electromagnetic survey system, comprising: (a) a transmitter section for generating a primary electromagnetic field that induces a secondary electromagnetic field; and (b) a receiver section for detecting the secondary electromagnetic field, wherein the receiver section comprises a plurality of receivers, each receiver further comprising at least one receiver
(Continued)

coil; and a tow assembly for an airborne electromagnetic surveying system, comprising a means for suspending a receiver section from an aircraft, the receiver section comprising a plurality of receivers each receiver comprising at least one receiver coil.

20 Claims, 11 Drawing Sheets

(51) Int. Cl.
*G01V 3/12* (2006.01)
*G01V 3/15* (2006.01)
*G01V 3/16* (2006.01)
*G01V 3/17* (2006.01)
*G01V 3/165* (2006.01)

(58) Field of Classification Search
USPC ....... 324/323, 326, 329, 330, 331, 332, 334, 324/336, 344

See application file for complete search history.

(56) References Cited

U.S. PATENT DOCUMENTS

| | | | |
|---|---|---|---|
| 7,157,914 B2* | 1/2007 | Morrison | G01V 3/165 324/330 |
| 7,646,201 B2 | 1/2010 | Miles et al. | |
| 7,681,831 B2* | 3/2010 | Kuzmin | G01V 3/17 244/1 TD |
| 2008/0246484 A1* | 10/2008 | Miles | G01V 3/165 324/330 |
| 2010/0188089 A1* | 7/2010 | Kuzmin | G01V 3/165 324/330 |
| 2014/0312905 A1* | 10/2014 | Wheelock | G01V 3/17 324/331 |

FOREIGN PATENT DOCUMENTS

| | | |
|---|---|---|
| WO | 2006/095251 A2 | 9/2006 |
| WO | 2009/137931 A1 | 11/2009 |

OTHER PUBLICATIONS

AU Office Action received in corresponding Australian Application No. 2013323090, dated Jul. 7, 2017.

* cited by examiner

MULTIPLE RECEIVERS FOR AIRBORNE ELECTROMAGNETIC SURVEYING

FIELD OF THE INVENTION

The present invention relates generally to airborne electromagnetic (EM) surveying systems and methods, and particularly to airborne EM systems comprising a plurality of receivers, each receiver comprising at least one receiver coil, for measuring magnetic fields or EM gradients.

BACKGROUND OF THE INVENTION

An airborne EM survey system generally includes a transmitter for generating a primary electromagnetic field that induces eddy currents in the earth. These eddy currents generate a secondary electromagnetic field or ground response. A receiver of the EM system then measures the response of the ground. The currents induced in the ground are a function of conductivity. By processing and interpreting the received signals, it is possible to estimate the distribution of conductivity in the subsurface.

EM measurements can be made in either frequency domain or time domain. In a frequency domain EM system, the transmitter generates a sinusoidal electromagnetic field at one or more frequencies. The amplitude and phase of the secondary field relative to the primary field are indicative of the subsurface conductivity. In a time domain EM system, transient pulses are applied to the transmitter during an ON-period to generate a primary electromagnetic field that induces a decaying secondary electromagnetic field. The receiver measures the amplitude and decay characteristics of the secondary field.

An airborne EM system's signal-to-noise ratio (SNR) is an important indication of the effective depth of exploration of the EM system and its ability to recognize and measure a potential target. Various systems and methods for improving SNR have been known in the art. For example, increasing the distance between the transmitter and receiver may reduce system noise thereby improving the SNR. In time domain systems, increasing the size of the transmitter loop may help increase SNR. However, these conventional improvements are transmitter dependent and usually result in increased overall system size and complexity.

Canadian Patent Application No. 2,748,278 proposes a passive geological surveying system using audio frequency magnetic (AFMAG) technology. The proposed system has a first aircraft towed receiver coil assembly and a second ground-based or airborne receiver coil assembly, wherein the differences in the audio magnetic field measured at the first and second receivers are used to interpret the location of the underground conductors. While this proposed system does not involve an active transmitter, it requires that the two receivers be sufficiently spaced apart, resulting in overall increased system size and complexity in computing the differences between the measurements at different locations.

Therefore, there remains a need for a system that provides improvements to the SNR and/or target discrimination performance of an EM system, independent of the transmitter, and without significantly increasing the overall size and complexity of the system.

SUMMARY OF THE INVENTION

The present invention improves the overall target discrimination performance and/or reduces the system operation noises of an EM system by providing an airborne EM system having two or more receivers.

In accordance with one aspect of the present invention, there is provided an airborne electromagnetic survey system, comprising:
(a) a transmitter section for generating a primary electromagnetic field that induces a secondary electromagnetic field; and
(b) a receiver section for detecting the secondary electromagnetic field, wherein the receiver section comprises a plurality of receivers, each receiver further comprising at least one receiver coil.

In accordance with another aspect of the present invention, there is provided a receiver section towed by an airborne electromagnetic survey system, comprising a plurality of receivers, each receiver comprising at least one receiver coil.

In accordance with a further aspect of the present invention, there is provided a tow assembly for an airborne electromagnetic surveying system, comprising means for suspending a receiver section from an aircraft, the receiver section comprising a plurality of receivers each receiver comprising at least one receiver coil; and means for suspending a transmitter section from the aircraft.

Other features and advantages of the present invention will become apparent from the following detailed description and the accompanying drawings, which illustrate, by way of example, the principles of the invention.

BRIEF DESCRIPTION OF THE DRAWINGS

The invention will now be described by way of reference to the drawings, in which.

DETAILED DESCRIPTION OF THE INVENTION

An aircraft towed EM survey system generally comprises a tow assembly further comprising a transmitter section and a receiver section.

The aircraft can be maimed or unmanned power driven fixed-wing aeroplane, helicopter, airship or any other flying machine, as a person skilled in the art would appreciate.

Figure 1:
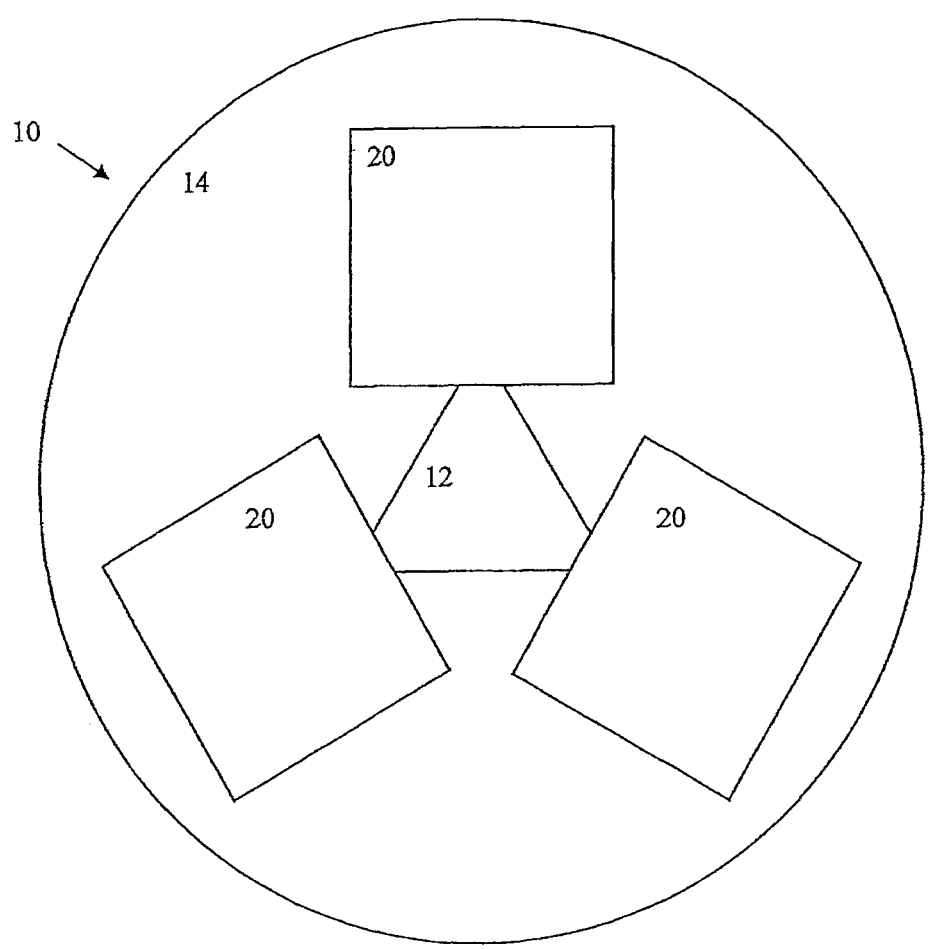
FIG. 1 is a schematic view of a receiver section according to an embodiment of the airborne EM system.

Referring to FIG. 1, one embodiment of the receiver section 10 described herein comprises a plurality of receivers 20 and a receiver support structure 12 for mounting the receivers. Each receiver 20 is positioned in proximity to at least one neighbouring receiver 20.

In one embodiment, the receivers 20 are positioned in proximity to each other, and may be disposed in any orientation relative to each other. Each receiver 20 comprises at least one receiver coil. The receiver 20 may independently detect the secondary electromagnetic fields.

The receiver section 10 or the receiver support structure thereof may include a receiver housing 14 for enclosing at least one of the receivers 20. The receiver housing 14 isolates the receivers 20 from external forces and noises, and keeps at least some receivers 20 close to each other.

In one embodiment, the receiver housing 14 can be a "bird" structure, which is an aerodynamic support structure that houses the EM receivers or sensors and other electronics.

However, such an enclosure structure is not required in all situations. In some embodiments, the at least one receiver 20 can be supported in its own housing or protective enclosure.

Figure 2:
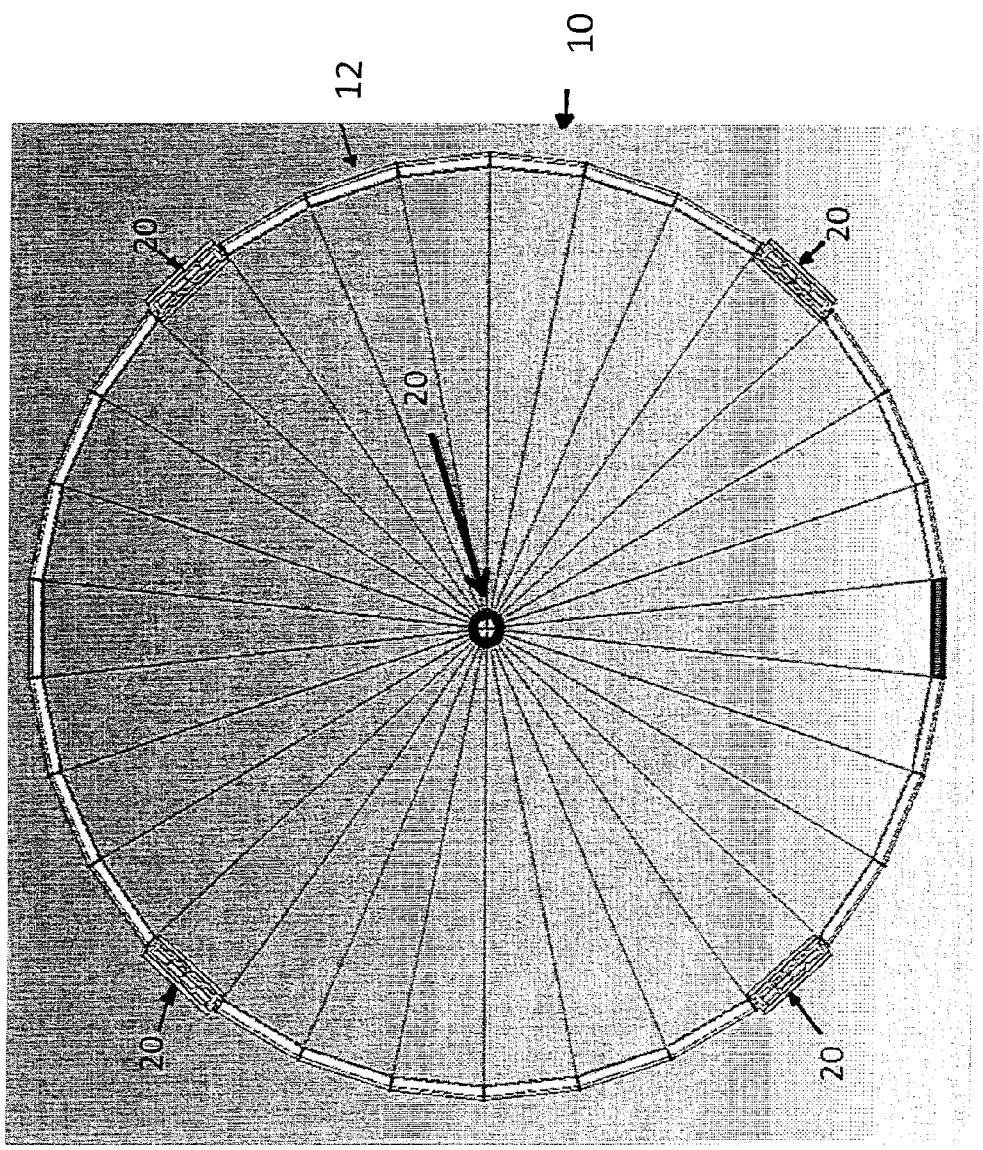
FIG. 2 is a perspective view of a receiver section according to an embodiment of the airborne EM system.
Figure 3:
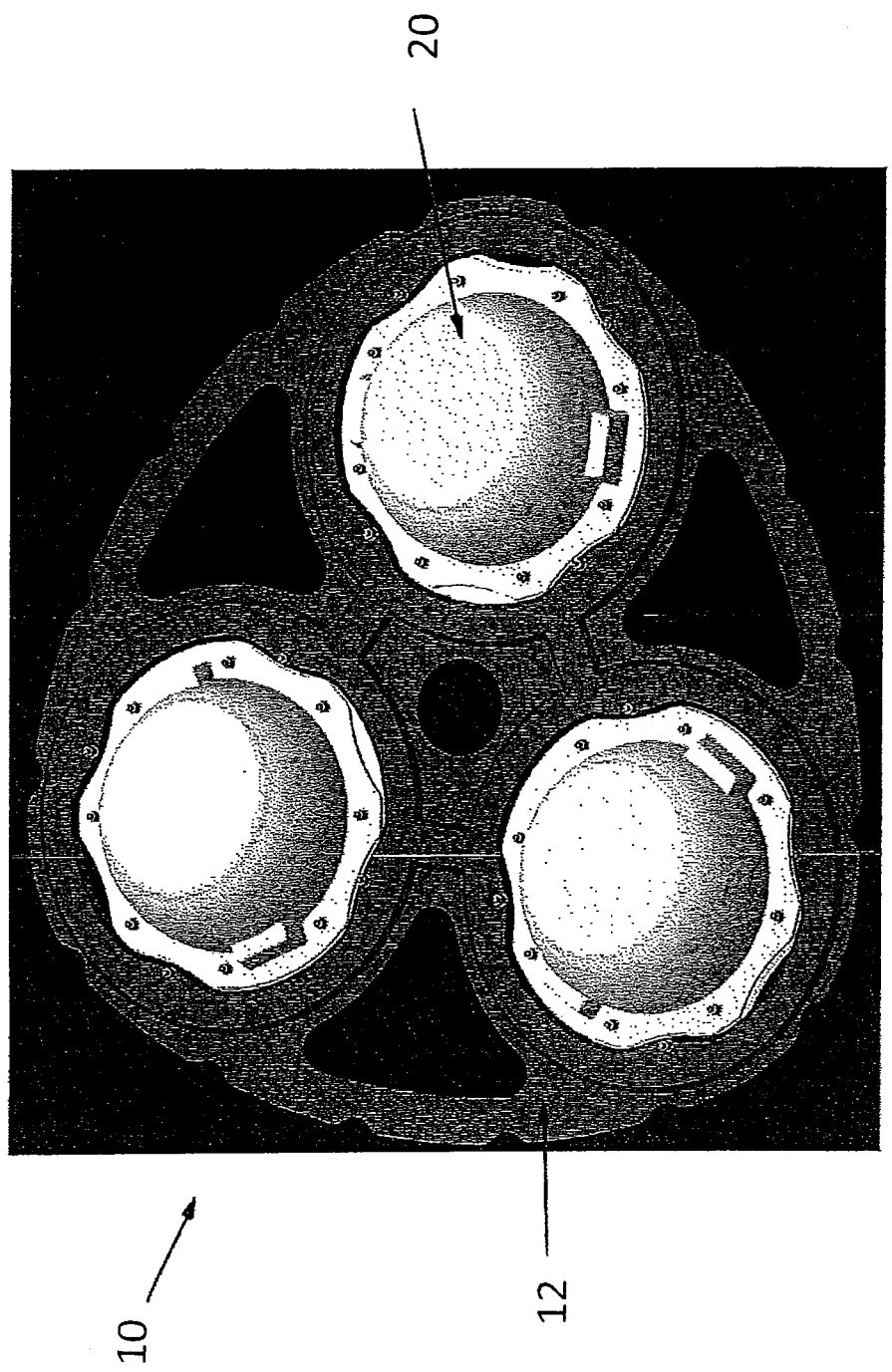
FIG. 3 is a perspective top view of a receiver section according to an embodiment of the airborne EM system.

Multiple receivers can take many forms, for example, in-plane multiple receivers as illustrated in FIG. 2 or platform multiple receivers as shown in FIG. 3. A person skilled in the art would appreciate that multiple receivers of any shape or size which is suitable may be used.

Referring to FIG. 2, and according to one embodiment of the airborne EM system described herein, the receiver section 10 comprises a plurality of receivers 20 supported by a substantially polygonal receiver support structure 12, wherein the receivers 20 are generally located in close proximity to their neighbouring receivers 20 and are disposed along a circumference of the receiver support structure 12. While a polygonal receiver support structure 12 is depicted in FIG. 3, a person skilled in the art would understand that a receiver support structure of any shape or size which is suitable may be used. Furthermore, the receivers 20 need not be identical and may be disposed in any orientation relative to each other.

Preferably, the receiver support structure 12 is modular and comprises serially connected tubular sections which can internally house the at least one receiver 20 at one or more locations. Alternatively, the receivers 20 can be supported on the receiver support structure 12 in any suitable manner.

The receiver support structure 12 may be constructed to form a support for the receivers 20 so that the configured distance between the receivers 20 and their relative orientations can be maintained substantially unchanged to provide stability of the receiver section 10. It is to be understood that rigid, non-rigid, semi-rigid or flexible receiver support structure 12 can be used depending on the requirements for a particular survey flight.

The embodiment illustrated in FIG. 2 may further include at least one receiver 20 positioned along a central axis that is substantially perpendicular to the plane defined by the receiver support structure 12, and being coupled to the receiver support frame 12 by a plurality of cross support means 24 such as cross ropes or cross bars or rods. At least one central receiver 20 may be disposed in a co-planar fashion with the receiver support frame 12, or may be concentric or co-axial with the receiver support frame 12. For example, the at least one central receiver 20 may be positioned above or below the plane as defined by the receiver support structure 12, or at the center of the receiver support structure 12.

Figure 4:
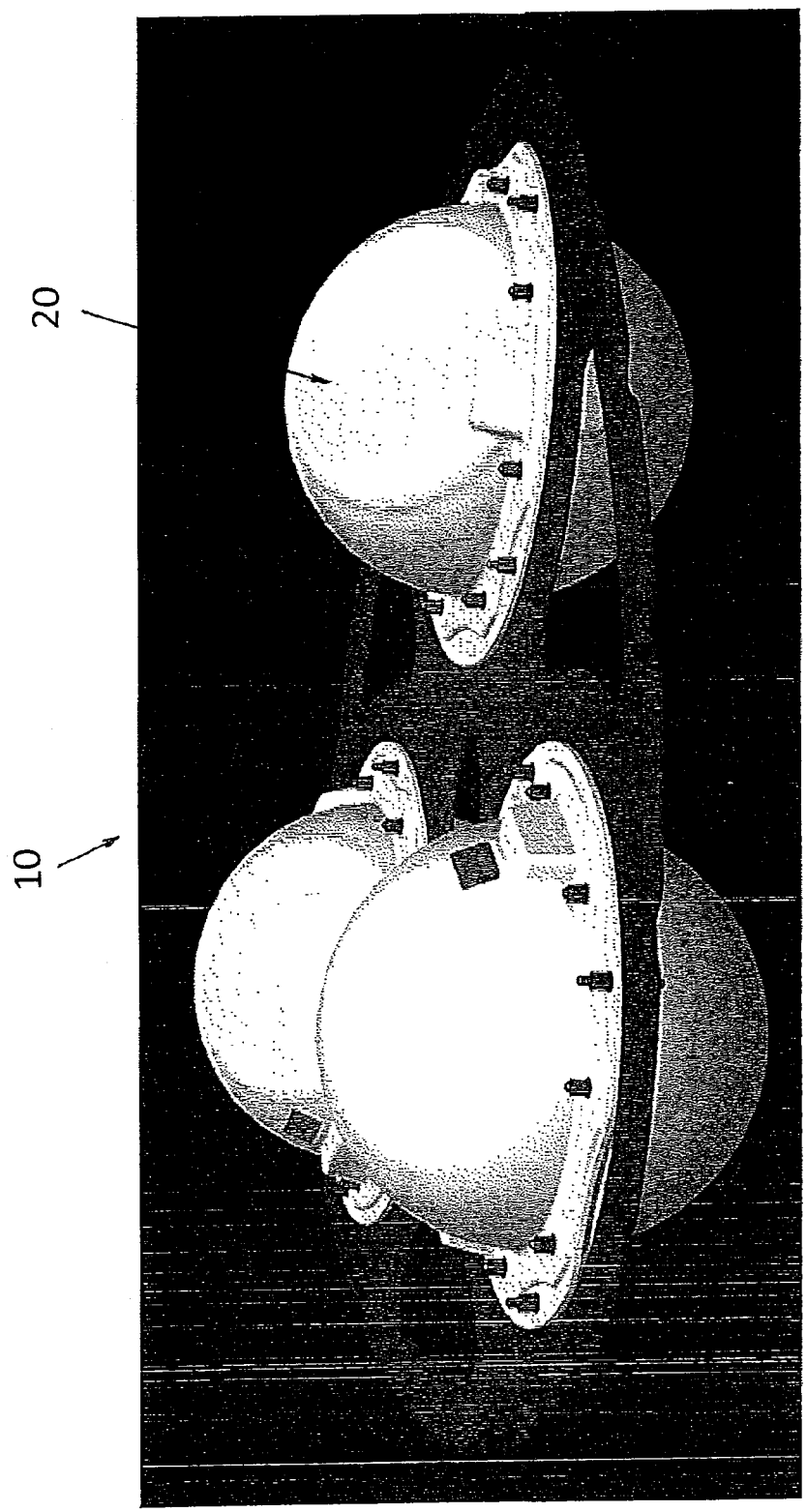
FIG. 4 is a perspective side view of a receiver section according to an embodiment of the airborne EM system.

Referring to FIGS. 3 and 4, and according to a further embodiment of the airborne EM system described herein, the receiver section 10 comprises a receiver support structure 12 having a plurality of mounting locations in proximity to each other to mount a plurality of receivers 20. At least one of the receivers 20 can be housed in an enclosure of any suitable configuration, size and shape. The receiver support structure 12 can be constructed to provide support for the receivers 20 and may include hollow portions or apertures to reduce the weight of receiver support structure 12. A person skilled in the art would understand that a rigid, semi-rigid or flexible receiver support structure 12 or enclosure can be used.

Figure 5:
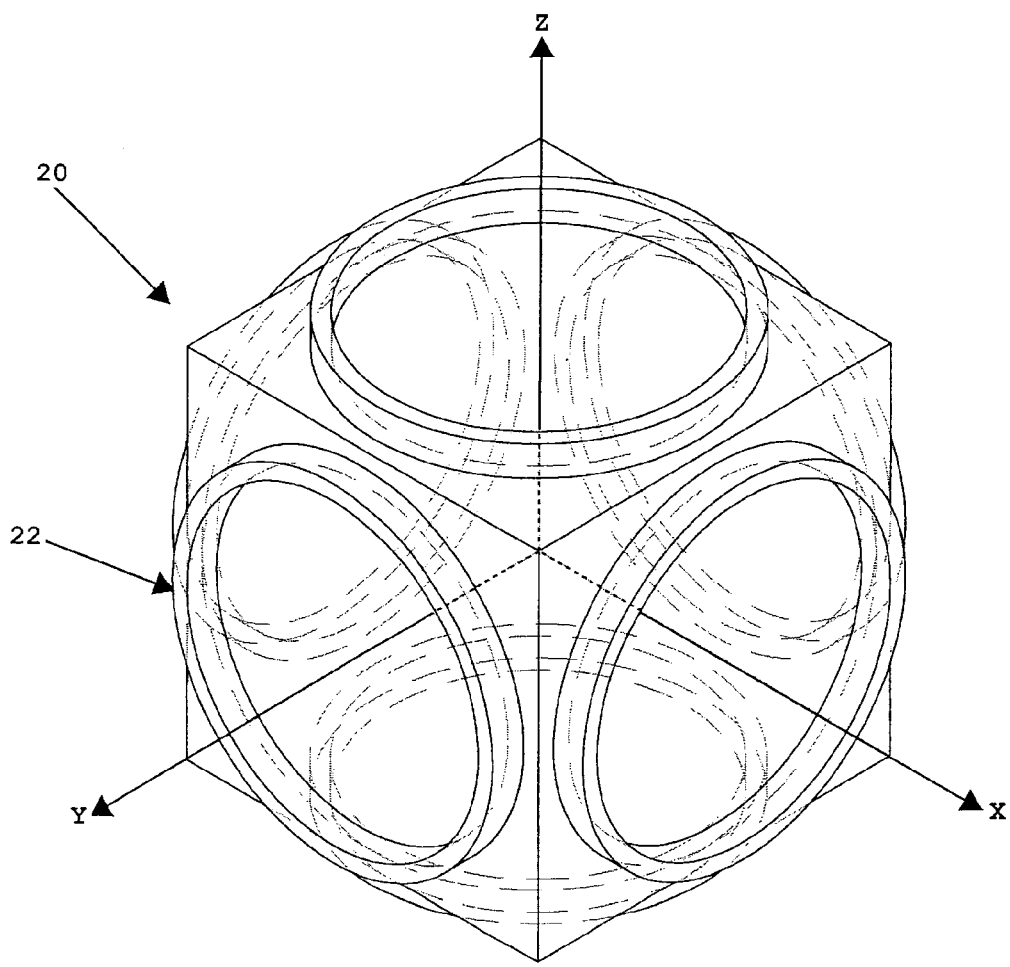
FIG. 5 is a perspective side view of a receiver comprising one or more receiver coils.

The receiver 20 comprises one or more receiver coils 22 as shown in FIG. 5. In the present disclosure, the non-limiting term "receiver coil" refers to a broad range of means for sensing electromagnetic fields, including various wires, induction magnetometers, and any associated electronics or circuitries for the proper functioning of the receiver coil.

The receiver coils 22 may be identical to each other, or may comprise coils of various sizes, shapes, materials or other physical characteristics.

Each receiver coil array may have three coplanar coils 22 that are partially overlapping with each other. It should also be understood that the coils in a receiver coil array need not to be coplanar in all circumstances. In other words, the coils 22 can be disposed in separate planes or surfaces while overlapping with each other.

The receiver configuration described above, namely substantially juxtaposing a plurality of receivers or configuring each receiver to be positioned in close proximity to at least one neighbouring receiver, allows an increased amount of electromagnetic flux to pass through the receiver section, and therefore improves the overall signal sensitivity of the receiver section. In addition, grouping multiple receiver coils into an array provides an increased effective area of a receiver for secondary electromagnetic flux to pass through, and therefore improves the overall signal sensitivity of the receiver. Furthermore, configuring a receiver such that all of its receiver coils are located in close proximity to each other allows an increased amount of electromagnetic flux to pass through the receiver, thereby improving the overall signal sensitivity of the receiver and the SNR of the EM system.

In practice, one issue arising from using such a configuration is that placing receivers or receiver coils one next to another may create mutual inductance between the coils. Mutual inductance increases instrumentation noise or system noise and may significantly limit the receiver's ability to respond to the secondary electromagnetic fields and the receiver's response bandwidth.

The present invention has discovered that the overall mutual inductance of coils somehow decreases significantly when multiple receivers, each having at least one receiver coil, are positioned close to their neighbouring receivers within a range of spacing that is dependent on various attributes of the coils. Based on this, the undesirable mutual inductance between the coils is minimized in the receiver section 10 described herein by maintaining close spacing between the receiver coils or between the receivers.

As described above, receiver section 10 comprises multiple receivers 20 wherein each receiver has one or more receiver coils 22. This receiver configuration provides some advantages over the current practice in the art.

One advantage is that the receiver configuration described herein can be implemented independent from the transmitter. In other words, improvement to the SNR of the EM system can be realized without increasing the transmitter size or modifying the distance or configuration relationship between the receiver section and the transmitter section.

Advantageously, keeping multiple receivers in proximity to each other minimizes or reduces the motion or vibration of a receiver relative to another, therefore improving the overall stability of the receiver section.

Furthermore, maintaining the receivers in close spatial proximity may reduce deviation between the secondary response measurements taken at neighbouring receiver locations, thus significantly simplifies the computation involved in determining the EM gradients of the earth response. For example, when the neighbouring receivers and respective receiver coils are configured to have substantially the same orientation, faster EM gradient computation can be achieved.

Figure 6:
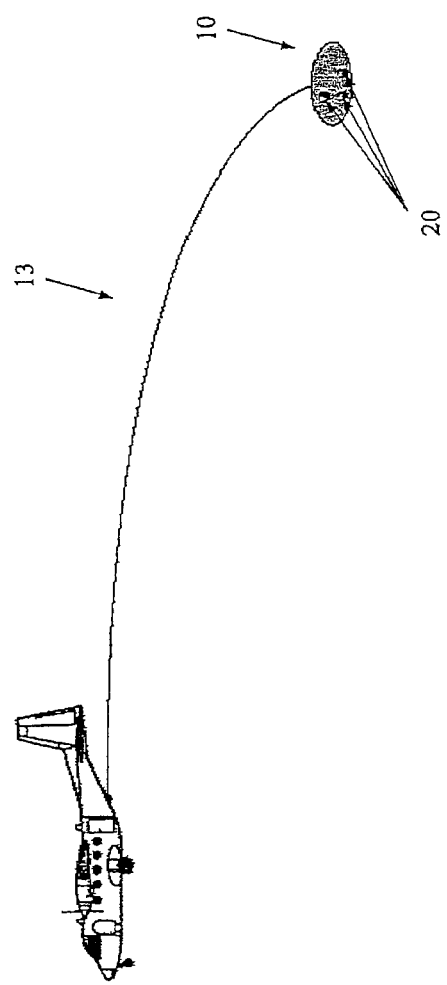
FIG. 6 is a schematic view of a single receiver section tow assembly comprising multiple receivers according to an embodiment of the airborne EM system.

As depicted in FIG. 6, to maintain physical proximity between the receivers 20, a receiver section 10 may comprise multiple receivers 20 towed by a common receiver tow assembly 13. The multiple receivers 20 are co-located in a single receiver section 10.

Figure 7:
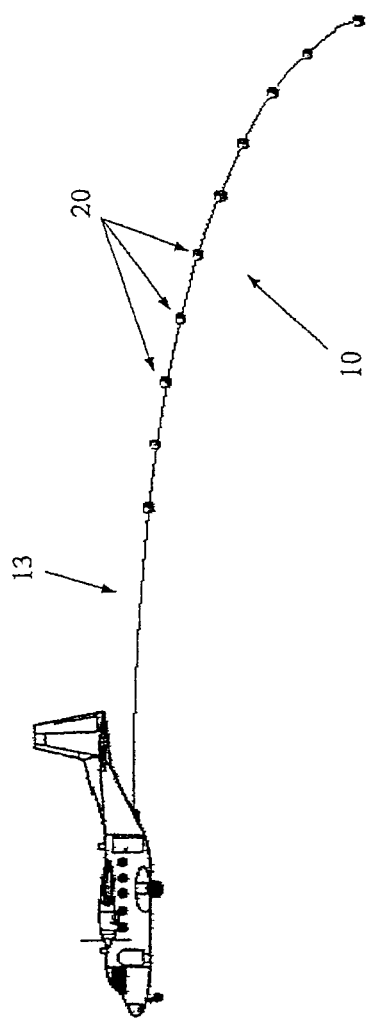
FIG. 7 is a schematic view of a single receiver section tow assembly comprising multiple receivers attached serially along the tow assembly according to an embodiment of the airborne EM system.

In one embodiment as shown in FIG. 7, the receivers 20 are serially connected within a common tow assembly 13 or a portion thereof and the receivers 20 are positioned in relative remoteness to each other. Each receiver 20 comprises at least one receiver coil. The receiver 20 may independently detect the secondary electromagnetic fields.

While a transmitter section is not shown in these Figures, a person skilled in the art would understand that the transmitter section can be configured in any suitable manner that is known in the art, for example, it can be towed below, concentric, or above the receiver section 10, or mounted to the aircraft.

In some embodiments, flexible means, such as tow ropes, tension cables can be used to tow the receiver section 10. Alternatively, the receiver section 10 can be towed by more rigid means such as connecting rods, bars, struts or other similar structures. Any other rigid, non-rigid, semi-rigid or flexible connections can also be used to provide the spacing or association between the receiver section and the rest of the airborne EM system.

Figure 8:
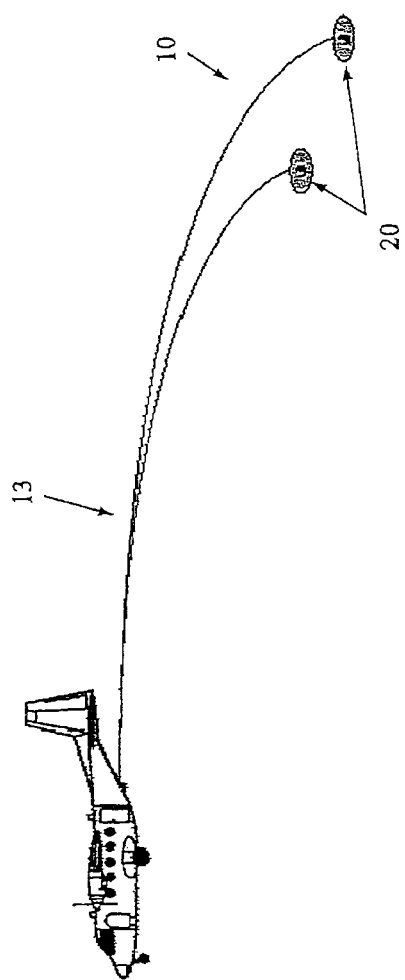
FIG. 8 is a schematic view of multiple receiver section tow assemblies each comprising a single receiver according to an embodiment of the airborne EM system.
Figure 9:
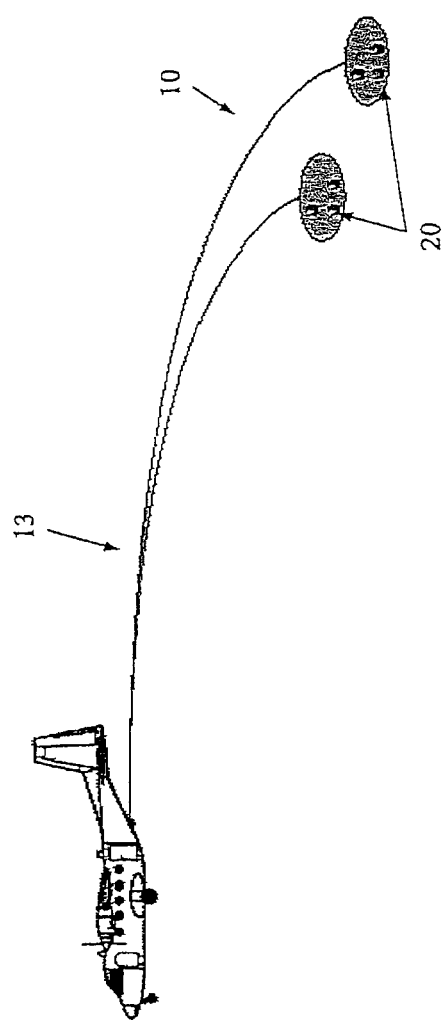
FIG. 9 is a schematic view of multiple receiver section tow assemblies each comprising multiple receivers according to an embodiment of the airborne EM system.
Figure 10:
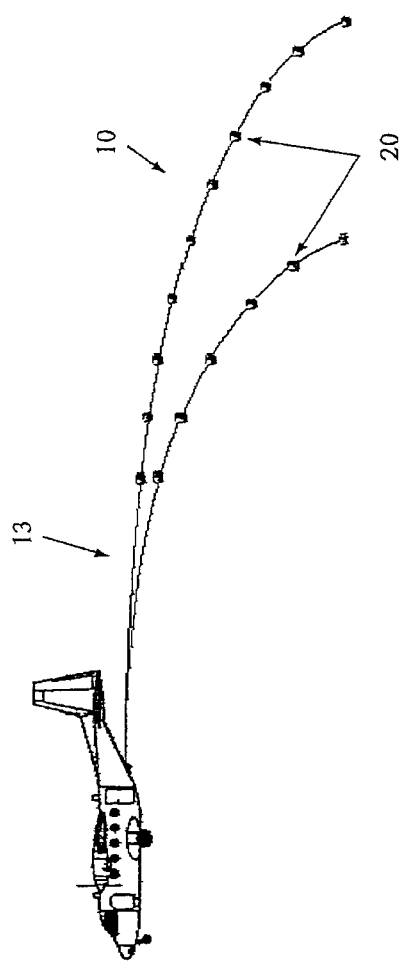
FIG. 10 is a schematic view of multiple receiver section tow assemblies each comprising multiple receivers attached serially along the tow assembly according to an embodiment of the airborne EM system.

Referring to FIGS. 8, 9 and 10, multiple receiver tow assemblies 13 may be used to tow the receiver section 10 having multiple receivers 20. Each tow assembly 13 may support at least one receiver 20. The multiple receiver tow assemblies 13 may have the same or different lengths. As such, the towed receivers 20 may operate at the same or different altitude during flight. In FIG. 8, each receiver 20 is towed separately and supported by its receiver support structure or protective housing structure.

In FIG. 9, each tow assembly 13 tows multiple receivers 20 which share a common protective housing structure.

In FIG. 10, each tow assembly 13 is towing multiple receivers 20 which are serially coupled, or attached to the tow assembly 13.

The receivers 20 can be positioned in parallel tow assemblies or support structures so that they are substantially located in close proximity to each other or to their neighbouring receivers during flight. Therefore, by simply grouping the existing receivers in accordance with the spacing that is appropriate for the receivers and coils in use, SNR improvement can be realized.

Furthermore, by locating multiple receivers 20 at a relatively remote distance and known position with respect to neighboring receivers 20, the shape of the secondary field can be measured at each individual transmitter location. Measurement of the field shape at each transmitter location is a technique used in terrestrial or marine geophysical exploration but has heretofore not been possible with airborne systems. The shape of the secondary field provides additional discrimination in the form of diagnostic information about the shape, orientation or position of a geological target.

Additionally, data measured with multiple receivers 20 at a relatively remote distance and known position with respect to neighboring receivers 20 may be manipulated in processing to focus or orient the sensitivity of the receiver section 10. This focussing reduces the spatial resolution of the system and improves target discrimination.

When multiple receiver tow assemblies 13 are used, it may be desirable to reduce relative motion and vibration between the receivers 20 supported on different tow assemblies 13. Accordingly, the receiver section 10 may further comprise means for connecting the tow assemblies 13 and relevant structures and means for stabilizing the receivers disposed in respective tow assembly. The connecting and stabilizing structures can be constructed to form rigid, non-rigid, semi-rigid or flexible coupling or connections.

For example, when multiple receivers are towed in series by a tow assembly 13, the tow assembly 13 may be configured to comprise a main tow rope, a split rope portion where the main rope is splitting into at least two ropes coupled to stabilizing structures therebetween.

Still further, for example, two or more spaced apart stabilizer bars can be coupled to the split ropes to form a stable and flexible support suitable for housing a receiver 20. A receiver 20 as described in the present disclosure, with or without protective cover, can be securely mounted to the above stable and flexible support structures. The tow assembly 13 may further comprise a converging portion where the at least two split ropes merge into another tow rope. The merged tow rope can be used as a connection rope to a transmitter section 4, another receiver 20, or any other component of the EM system described herein.

Stabilizer structures can also be used to provide stable and flexible coupling between multiple receiver tow assemblies 13. For example, when multiple receivers 20 are towed in parallel in at least two tow assemblies 13, the tow assemblies 13 may be coupled to stabilizing structures therebetween as described above. Such stabilizing structures can be deployed at multiple positions along the lengths of the tow assemblies 13 to provide the overall stability of the receiver section 10.

In some embodiments, the parallel tow assemblies 13 are connected to each other by rigid connecting means such as rods, joints, bars or the like. However, as a person skilled in the art would appreciate, various rigid, non-rigid, semi-rigid or flexible supporting means and configurations are equally applicable in such an embodiment.

A person skilled in the art would appreciate that the receiver section 10 described herein can be scaled according to the surveying task at hand. For example, a large size aircraft or helicopter may readily carry more than one receiver sections as described in the present disclosure.

The receiver section 10 described in the present disclosure can be used in a variety of airborne EM systems include time domain and frequency domain systems. The transmitter section 4 and receiver section 10 described herein may cooperate with each other during flight in any suitable configuration. For example, they can be configured to cooperate in a spaced apart relationship. Depending on the surveying tasks, system load capacity, and the availability of operating space, they can also be deployed in relatively close proximity, or substantially co-located or supported by common supporting means. Regardless of their relative position and configuration, various supporting means can be used to support the transmitter and receiver sections, including flexible, semi-rigid, or rigid support frames.

Figure 11:
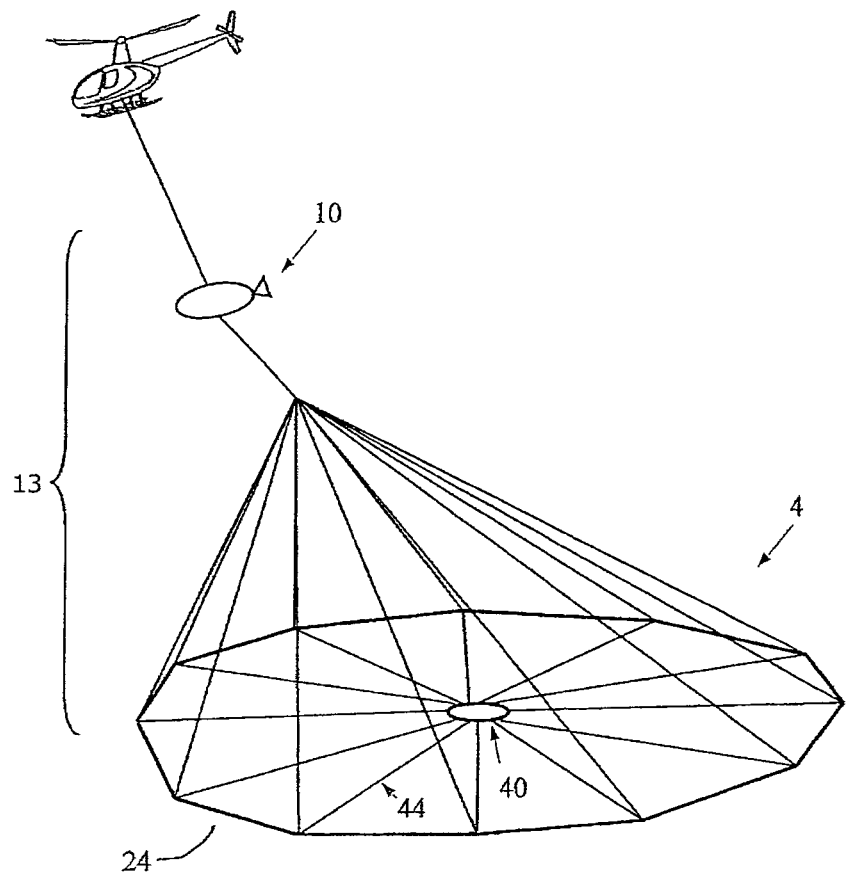
FIG. 11 is a schematic perspective view of an illustrative embodiment of the airborne EM system in an airborne position flying at surveying speeds.

In one embodiment, the transmitter and receiver sections are disposed in a common tow assembly 13 and are operative at different altitudes relative to the ground. Preferably, the transmitter section 4 comprises a transmitter loop 24 that has a substantially circular or polygonal periphery. The receiver section 10 may be positioned above or below the transmitter section 4, as illustrated in FIG. 11, and is offset from the center of the transmitter section. However, it is to be understood that the spacing between the transmitter section 4 and the receiver section 10 can also be maintained by a concentric configuration, or in a coplanar fashion. For example, in one embodiment, the receiver section 10 is positioned above the transmitter section 4 and in between the aircraft and the transmitter section 4.

In one embodiment, the receiver section 10 is located at the center of the transmitter section 4. Preferably, the centrally located receiver section 10 is coupled to the transmitter section 4 using cross support structures such as cross ropes 44, as shown in FIG. 11. A transmitter driver 40 can be co-located with the receiver section 10 or can be placed at a different location. In case the receiver section 10 and the transmitter driver 40 are both located at the center of the transmitter loop, it is preferable that a transmitter platform rope is used to support the transmitter driver 40 from the tow assembly 2 to maintain the planar stability of the transmitter loop 24.

In some embodiments, flexible means, such as tow ropes, tension cables can be used to connect or interconnect the transmitter section 4 and the receiver section 10. Alternatively, the transmitter section is connected or coupled to the receiver section by rigid means such as connecting rods, bars, struts or other similar structures. Any other rigid, semi-rigid or flexible connections can also be used to provide the spacing or association between the transmitter section and the receiver section.

Although the present invention has been described in considerable detail with reference to certain preferred embodiments thereof, other embodiments and modifications are possible. Therefore, the scope of the appended claims should not be limited by the preferred embodiments set forth in the examples, but should be given the broadest interpretation consistent with the description as a whole.

What is claimed is:

1. An airborne electromagnetic survey system, comprising: a transmitter section for generating a primary electromagnetic field that induces a secondary electromagnetic field; and a receiver section for detecting the secondary electromagnetic field, wherein the receiver section comprises: a modular receiver support structure comprising a plurality of serially connected tubular sections; a plurality of receivers, each receiver disposed in one of the tubular sections and comprising at least one receiver coil responsive to the secondary electromagnetic field wherein the modular receiver support structure defines a plane and the plurality of receivers are distributed in the plane; and wherein adjacent receivers are spaced from each other within the modular receiver support structure within a range of spacing based on attributes of the receiver coils in the adjacent receivers.

2. The airborne electromagnetic survey system of claim 1, further comprising:

an aircraft; and
a tow assembly in contact with the aircraft and at least one of the transmitter section and the receiver section for suspending the transmitter section or the receiver section from the aircraft.

3. The airborne electromagnetic survey system of claim 2, wherein the tow assembly further comprising at least one stabilizer structure attached to the tow structure and the modular receiver support structure for stabilizing at least one of the plurality of receivers.

4. The airborne electromagnetic survey system of claim 2, wherein the receiver section is positioned above the transmitter section between the aircraft and the transmitter section.

5. The airborne electromagnetic survey system of claim 1, wherein:
the modular receiver support structure is configured to maintain a fixed distance between receiver coils in the receivers and a fixed orientation of each receiver coil within the modular receiver support structure.

6. The airborne electromagnetic survey system of claim 1, wherein:
the receiver section further comprises at least one additional receiver disposed along an axis perpendicular to the plane and comprising at least one additional receiver coil responsive to the secondary electromagnetic field.

7. The airborne electromagnetic survey system of claim 6, wherein:
the modular receiver support structure comprises a circle; and
the at least one additional receiver is disposed along a central axis of the circle.

8. The airborne electromagnetic survey system of claim 6, wherein the at least one additional receiver is disposed in the plane.

9. The airborne electromagnetic survey system of claim 8, wherein:
the modular receiver support structure comprises a circle; and
the at least one additional receiver is concentric with the circle.

10. The airborne electromagnetic survey system of claim 6, wherein the at least one additional receiver is disposed above the plane between the aircraft and the modular receiver support structure.

11. The airborne electromagnetic survey system of claim 1, wherein the modular receiver support structure comprises a polygon.

12. An airborne electromagnetic survey system, comprising: a transmitter section for generating a primary electromagnetic field that induces a secondary electromagnetic field, the transmitter section comprising a circular transmitter loop; a receiver support structure having a plurality of mounting locations, the receiver support structure defining a plane; a receiver section for detecting the secondary electromagnetic field, the receiver section spaced from the transmitter section and comprising plural receivers, each mounted at a corresponding mounting position of the plurality of mounting locations of the receiver support structure; each receiver of the plural receivers comprising at least one receiver coil responsive to the secondary electromagnetic field; a common tow assembly attached to the transmitter section and the receiver section, wherein the plural receivers are distributed in the plane; and wherein adjacent receivers are spaced from each other within the receiver support structure within a range of spacing based on attributes of the receiver coils in the adjacent receivers.

13. The airborne electromagnetic survey system of claim 12, further comprising an aircraft, the common tow assembly in contact with the aircraft and the transmitter section and the receiver section maintained at different altitudes below the aircraft by the common tow assembly.

14. The airborne electromagnetic survey system of claim 13, wherein the receiver section is located between the aircraft and the transmitter section.

15. The airborne electromagnetic survey system of claim 14, wherein the receiver section is offset from a central axis of the circular transmitter loop of the transmitter section.

16. The airborne electromagnetic survey system of claim 12, wherein the receiver section further comprises at least one additional receiver disposed along an axis perpendicular to the plane and comprising at least one additional receiver coil responsive to the secondary electromagnetic field.

17. The airborne electromagnetic survey system of claim 12, wherein each receiver of the receiver section has plural coils orthogonal to each other.

18. The airborne electromagnetic survey system of claim 17, further comprising a transmitter driver.

19. The airborne electromagnetic survey system of claim 18, further comprising a transmitter platform rope in contact with the transmitter driver, the circular transmitter loop and the common tow assembly to support the transmitter driver from the tow assembly and to maintain a planar stability of the circular transmitter loop.

20. An airborne electromagnetic survey system, comprising: a transmitter section for generating a primary electromagnetic field that induces a secondary electromagnetic field, the transmitter section comprising a circular transmitter loop; a receiver support structure defining a plane; a receiver section for detecting the secondary electromagnetic field, the receiver section spaced from the transmitter section and comprising at least one receiver comprising at least one receiver coil responsive to the secondary electromagnetic field; wherein adjacent receivers are spaced from each other within the receiver support structure within a range of spacing based on attributes of the receiver coils in the adjacent receivers; a common tow assembly attached to the transmitter section and the receiver section; and an aircraft, the common tow assembly in contact with the aircraft and the transmitter section and the receiver section maintained at different altitudes below the aircraft by the common tow assembly, wherein the receiver section is located between the aircraft and the transmitter section.

* * * * *